United States Patent [19]
Simmons

[11] 3,759,020
[45] Sept. 18, 1973

[54] GRASS CLIPPER

[75] Inventor: Frank A. Simmons, Grayslake, Ill.

[73] Assignee: Burgess Vibrocrafters, Inc., Grayslake, Ill.

[22] Filed: July 31, 1972

[21] Appl. No.: 276,512

[52] U.S. Cl. ............ 56/17.5, 56/255, 56/295, 30/276, 30/DIG. 1, 30/DIG. 5
[51] Int. Cl. ............................................. A01d 35/26
[58] Field of Search .......... 30/DIG. 1, DIG. 5, 30/215, 216, 220, 221, 222, 240, 263, 264, 276, 347; 56/11.9, 17.5, 295, 255, 256, 16.9, 16.7

[56] References Cited
UNITED STATES PATENTS

| | | | |
|---|---|---|---|
| 697,415 | 4/1902 | Spates | 56/255 |
| 2,149,463 | 3/1939 | Orr | 56/10.1 |
| 2,648,187 | 8/1953 | Ries | 56/16.9 |
| 2,672,002 | 3/1954 | Nelson | 56/16.9 |
| 2,827,748 | 3/1958 | Simpson | 56/16.9 |
| 2,867,040 | 1/1959 | Mertesdorf | 30/240 |
| 2,932,144 | 4/1960 | Garner, Sr. et al. | 56/16.9 |
| 3,192,625 | 7/1965 | McJohnson | 30/276 |
| 3,221,481 | 12/1965 | Mattson et al. | 56/16.9 |
| 3,561,199 | 2/1971 | Lay | 56/17.1 |
| 3,623,223 | 11/1971 | Edgell et al. | 30/220 |

FOREIGN PATENTS OR APPLICATIONS

| | | | |
|---|---|---|---|
| 253,199 | 11/1948 | Switzerland | 56/17.5 |

*Primary Examiner*—Russell R. Kinsey
*Attorney*—Howard H. Darbo et al.

[57] ABSTRACT

A motor driven hand operated grass clipper for lawn trimming has a knife blade arranged for rotation between a pair of fixed grass combs. Grass accumulation at the hub of the rotor is avoided by the provision of a solid circular central area which may be a separate disk and which limits the blade cutting edges to the end portions only and throws out clippings that might otherwise wind around the rotating mechanism. An extension handle and a skid attachment are provided.

14 Claims, 8 Drawing Figures

Patented Sept. 18, 1973
3,759,020
3 Sheets-Sheet 1
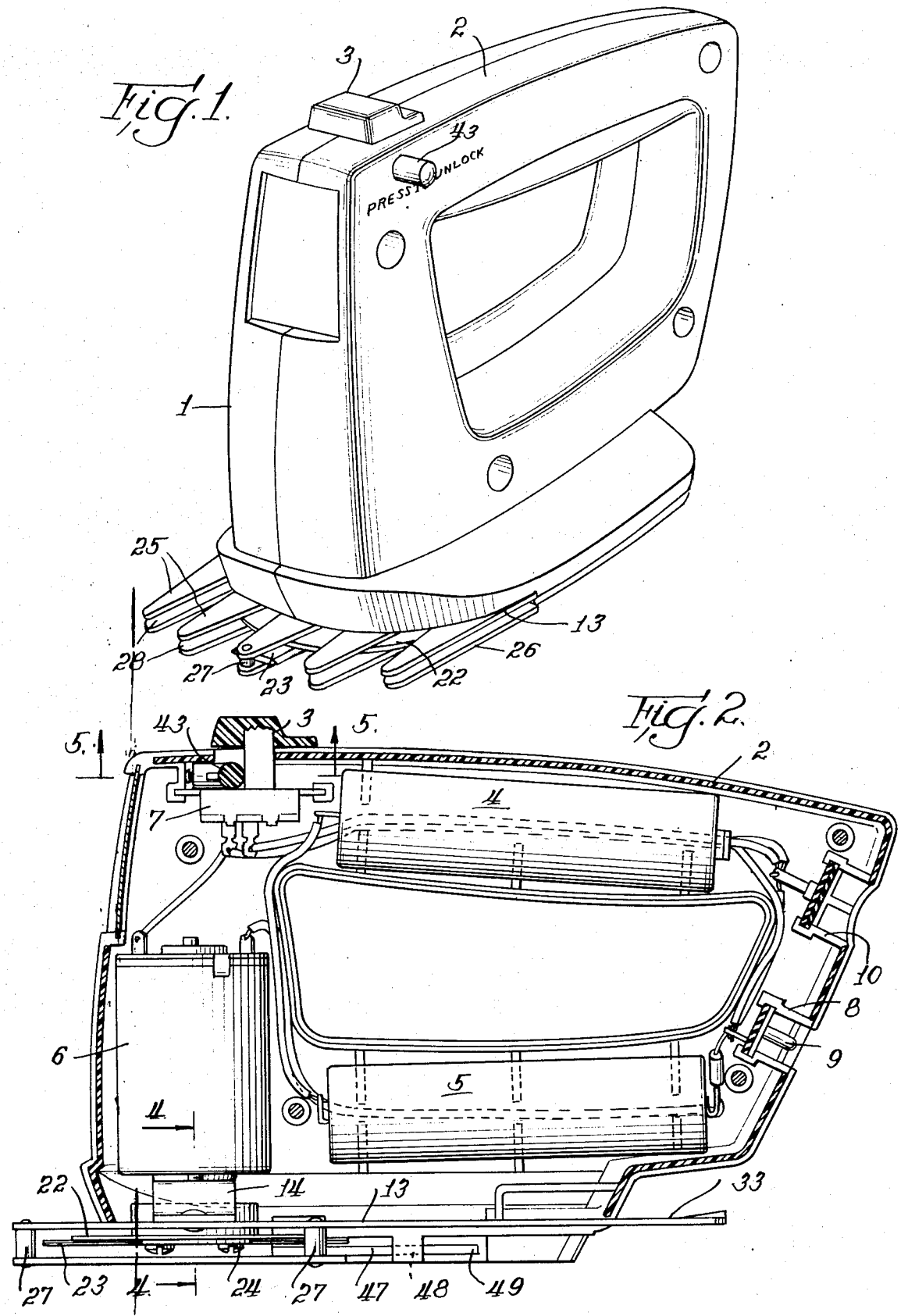

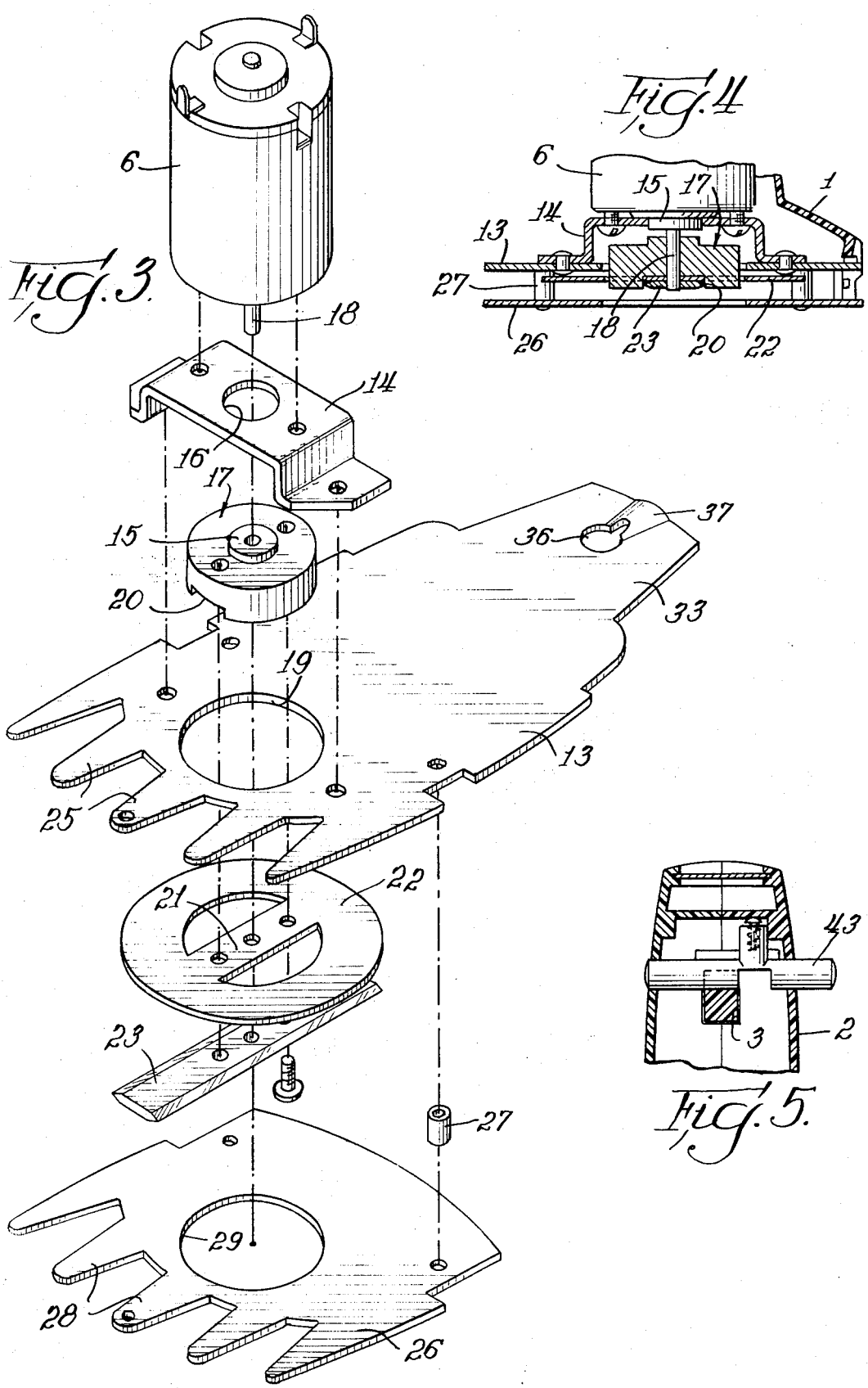

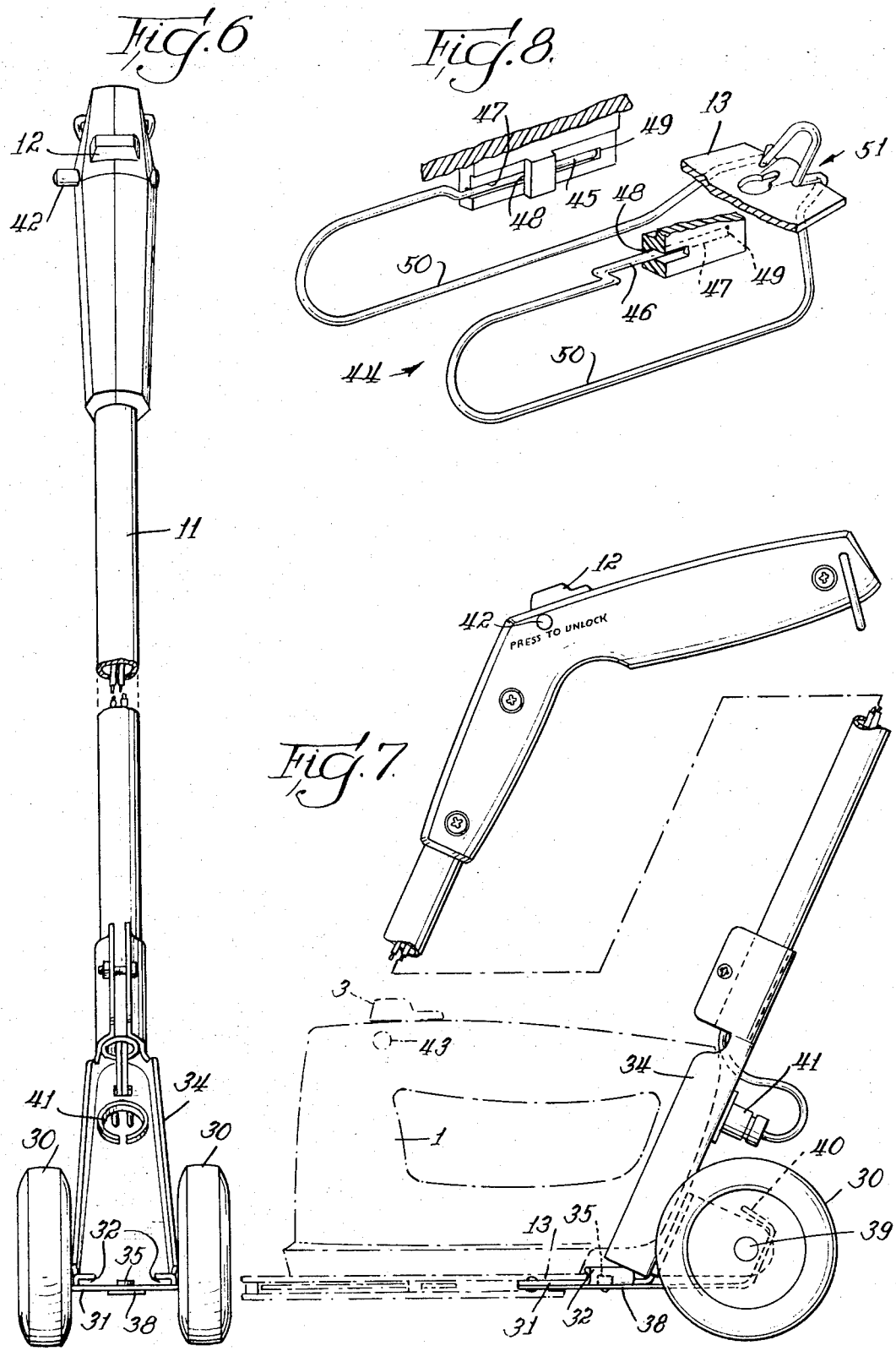

3,759,020

GRASS CLIPPER

BACKGROUND AND SUMMARY OF THE INVENTION

Following many years of use of various forms of hand held and manually operated scissors for trimming lawns, power units, usually employing electric motors, were devised and made available for use in place of the hand scissors. One type of power unit was essentially an adaptation of the scissors wherein the blades and stalks of grass were sheared off by a pair of relatively reciprocating sickle bars. This device was very sensitive to hard twigs, pebbles and other obstructions in its cutting path which frequently rendered the device unusable. Even a small nick, especially if accompanied by some local bending of the edge of the blade, rendered the device unusable. Another type of power grass clipper provided a rapidly rotating pair of unguarded knives. This device was not only dangerous to use but tended to collect grass stems and the like at the hub of the rotor, resulting in excessive wear and binding requiring frequent stoppage and cleaning — itself a hazardous operation. In the case of battery powered units, stalling of the motor is particularly undesirable because the near short circuit heavily drains the battery.

The present invention provides a grass clipper having guarded rotary blades which pass at high speed between fixed combs which prevent access to the blades of heavier materials not intended to be cut and which enhance the grass cutting action by holding the stalks and leaves in a straight and upright position to receive the impact of the cutting edges. An important object of the invention is to provide such a grass clipper which in operation does not collect and wind grass stalks and leaves or the like around the hub of the rotor with the consequences above enumerated. More specifically, the rotor assembly includes a solid central disk portion which throws out cut materials after severance by the end portions of the blades which project only a short distance outwardly beyond the periphery of this solid area. Stalling and the necessity of stopping and cleaning out the rotor mechanism are avoided.

Another object is to provide an easily detachable handle enabling operation by a person in upright position.

The achievements and advantages of the grass clipper of this invention will become more fully apparent as the description thereof proceeds in conjunction with the accompanying drawings.

DESCRIPTION OF THE DRAWINGS

FIG. 1 is a perspective view of the grass clipper of the invention.

FIG. 2 is a longitudinal cross-sectional view.

FIG. 3 is an exploded view showing the rotor and comb assembly.

FIGS. 4 and 5 are detail views in cross section taken at the lines 4 — 4 and 5 — 5 of FIG. 2 respectively.

FIG. 6 is a front view of the detachable handle.

FIG. 7 is a side view of the detachable handle in relation to the grass clipper.

FIG. 8 is a perspective view of the bottom of the clipper, partly in section, showing a skid accessory.

DESCRIPTION OF SPECIFIC EMBODIMENT

The grass clipper mechanism is mounted within housing 1 which provides a handle 2 with the control switch button 3 arranged thereon for convenient operation by the thumb of the user. Batteries 4 and 5 are arranged as shown in FIG. 2 with necessary electrical connections to motor 6 through switch 7. A socket 8 having a pair of prongs 9 connected with the batteries through a diode circuit is provided for recharging the batteries with diode rectified d.c. current. A socket 10 provides for connection of a detachable extension handle 11 (FIGS. 6 and 7) which is equipped with a switch 12 electrically connected in parallel with switch 7 for independent remote control of the operation of the clipper. The rotor assembly is mounted upon base plate 13 which, in turn, is securely fastened to the bottom of housing 1. Motor 6 is mounted upon yoke 14 with boss 15 fitted into a hole 16 provided at the center of the platform of yoke 14. A cylindrical hub 17 is secured to motor drive shaft 18 and is arranged with adequate clearance in hole 19 in plate 13. The hub is provided with a diametrical rectangular groove 20 in its underface for retention therein of diametrical bar 21 of disk 22. Cutter blade 23 which lies against the underside of disk 22 along bar 21 is fastened, along with the disk itself, to hub 17 by means of a pair of screws 24.

The forward end of plate 13 is provided with a comb comprising a plurality of spaced teeth 25. A similar lower comb 26 is fastened to plate 13 through spacers 27. The lower and upper combs are identical so that the tines 25 are directly above teeth 28 of the lower comb. The body of lower comb 26 is provided with a hole 29 which is coaxial with hole 19 and of approximately the same diameter. This hole is provided to permit the escape of clippings that may find their way between blade 23 and the lower comb plate. It also serves to provide access to the blade mounting screws so that the blade can be reversed or replaced without taking the mechanism apart.

As is best seen in FIG. 4, cutter blade 23 lies and rotates in a plane which is equidistant from the planes of the upper and lower comb plates. The spacing between these planes may be, for example, one-eighth inch. The disk 22, about 2½ inches in diameter, limits the cutting edges at the ends of a 3 inch long blade to one-fourth inch. Operated at a speed of approximately '8,000 r.p.m., this projection is sufficient to cut grass entering between the tines of the combs with normal movements of the clipper in the lawn trimming operation.

Extension handle 11 has wheels 30 mounted at the bottom thereof and a connection plate 31 having ways 32 which are adapted to receive the tongue 33 at the rear end of plate 13. The sides of tongue 33 converge rearwardly as do ways 32 whereby these parts interfit snugly as catch 35 snaps into hole 36 being guided thereto by inclined groove 37 and pressed thereinto by leaf spring 38. Side flanges 34 embrace the sides of the clipper housing.

Leaf spring 38 is firmly attached to plate 31 at its forward end and catch 35 is fastened to the spring and is urged upwardly thereby. The distal end of the spring extends around and back over axle 39 to provide a stop 40 which limits the extent to which the spring can be forced downwardly to withdraw and release catch 35 to disconnect the handle from the clipper.

A plug 41, electrically connected with switch 12, fits into socket 10 to connect switch 12 into the battery-motor circuit in parallel with switch 7. Both switches are provided with safety locking pins 42, 43. The movement of pin 43 from the locked off position shown in FIG. 5 permits movement of the switch button 3 to the on position.

If desired, a skid 44 (FIG. 8) may be employed to support the clipper at a predetermined height above the ground. This both relieves some of the load carried by the operator and limits the closeness of cutting. It may be made from spring wire having ends 45 and 46 which extend along guide grooves 47 provided at the bottom of the sides of housing 1 and through holes 48 to the groove end stops 49. Curved runners 50 extend back to a hook 51 which snaps over the end of base plate 13 to hold the skid in place. The skid may be removed by forcing the hook out away from plate 13 against the pressure exerted by the spring wire skid structure and withdrawing ends 45 and 46 from the housing. A principal feature of the operation of the grass clipper of this invention is its freedom from the problem of binding of clippings and other materials in and around the hub of the rotor. The bulk of the clippings are thrown out and to the side immediately upon severance from the stem and any that tend to stick and that might be wound around the hub are thrown out as they reach the surface of the disk so that they never become attached to the mechanism. Since even a small amount of material caught in the rotating mechanism will create some drag with consequent loss of power and electric drain on batteries increasing to maximum at stall conditions, the clipper herein described brings full power to bear to the work of severing the grass stems and leaves with resulting efficiency and full productive use of the batteries before recharging becomes necessary. The extension handle and the skid provide conveniences which contribute significantly to the ease and efficiency of use of the clipper.

I Claim

1. In a grass clipper having a horizontal rotor equipped with cutter blades and driven by a motor, the improvement wherein the rotor comprises a hub fixed upon the drive shaft of the motor, a disk adjacent said hub and disposed in a plane normal to the drive shaft, said disk having a solid peripheral portion extending outwardly from said hub, a cutter blade adjacent said hub and disk projecting outwardly beyond the periphery of said disk, and a pair of similarly oriented parallel stationary combs spaced respectively above and below the plane of said cutter blade, the spaces between the teeth of said combs extending inwardly at least to the periphery of said disk.

2. A clipper in accordance with claim 1 wherein the disk is fastened to the bottom of the hub and the cutter blade is fastened to said disk.

3. A clipper in accordance with claim 2 wherein the disk has a central hole therein equal in diameter to the diameter of the hub and a diametrical bar integral with said disk spanning said hole, said hub having a diametrical groove in the bottom thereof adapted to receive said bar, and screws fastening the cutter blade to said bar of said disk and said bar to said hub.

4. Structure in accordance with claim 3 wherein the cutter blade is a single flat blade having its respective ends projecting beyond the periphery of the disk.

5. Structure in accordance with claim 4 wherein the cutter blade is provided with cutting edges along both sides thereof whereby it can be turned over to present new grass cutting edges.

6. A clipper in accordance with claim 1 wherein the combs are identical and the respective teeth thereof are in vertical alignment whereby to provide vertical guideways therebetween for guidling grass stalks and the like to the cutting zone and holding the same to facilitate cutting.

7. A clipper in accordance with claim 3 wherein the lower comb is integral with a plate which extends rearwardly therefrom under the disk and blade structure, said plate having a hole therein concentric with said disk for escape of grass clippings and access to the screws which fasten the blade to said disk.

8. A clipper in accordance with claim 1 wherein the upper comb is integral with a plate which extends rearwardly therefrom and terminates in a tongue having converging side edges, an extension handle having a pair of wheels mounted at the bottom end thereof and a connection plate extending forwardly of said wheels, said connection plate having ways diverging forwardly and adapted to receive said tongue snugly therein and overlying said connection plate, said tongue and said connection plate having aligned holes therein, and a spring mounted releasable catch extending through both said holes to lock said extension handle to said clipper.

9. Structure in accordance with claim 8 wherein the spring carrying the releasable catch comprises a leaf spring secured at one end to the forward end of the connection plate and the distal end thereof curves around the axle of the pair of wheels in spaced relation thereto wherely said catch may be released by downward movement of said distal end of said leaf spring which movement is limited by engagement of said distal end of said spring with said axle.

10. A clipper in accordance with claim 8 and including an electric motor and batteries to power the same and switch means to control said motor all mounted in the clipper structure, the extension handle having similar switch means mounted therein, and electric connection means including male and female socket elements mounted respectively in said clipper structure and in said handle extension for connecting said two switch means in parallel whereby said motor may be controlled by said switch means in said extension handle.

11. A grass clipper comprising a housing having the structure of claim 1 mounted therein and a skid detachably supported by said housing and arranged under said clipper to support the same a predetermined distance above the ground.

12. Structure in accordance with claim 11 wherein the skid comprises spring wire runners curving upwardly at their forward ends then rearwardly into the housing, said housing having socket means for receiving and holding the end portions of the respective runners, the rear end of the skid including a hook which engages clipper structure with releasable spring pressure.

13. In a grass clipper having cutting means, an electric motor drivingly connected with said cutting means, and an electric switch connected with said motor for turning it off or on, all mounted in a housing, the improvement which comprises an extension handle having a pair of wheels mounted at the bottom end thereof, means for demountably attaching said handle to the clipper housing, an electric switch mounted in the top part of said handle, and means for electrically connecting said handle switch in parallel with the switch mounted in the clipper housing whereby the clipper may be guided and operated by a person in standing position.

14. Structure in accordance with claim 13 wherein the housing has mounted therein a plate which extends rearwardly from said housing and terminates in a tongue having converging side edges and the means for demountably attaching the extension handle to the clipper housing comprises a connection plate extending forwardly of the wheels, said connection plate having ways diverging forwardly and adapted to receive said tongue snugly therein and overlying said connection plate, said tongue and said connection plate having aligned holes therein, and a spring-mounted releasable catch extending through both of said holes to lock said extension handle to the clipper housing.

* * * * *